(12) United States Patent
Tanaka

(10) Patent No.: US 6,719,375 B2
(45) Date of Patent: Apr. 13, 2004

(54) WHEEL RIM AND WHEEL RIM MANUFACTURING METHOD

(75) Inventor: Takeshi Tanaka, Higashiosaka (JP)

(73) Assignee: Work Co., Ltd., Osaka (JP)

( * ) Notice: Subject to any disclaimer, the term of this patent is extended or adjusted under 35 U.S.C. 154(b) by 0 days.

(21) Appl. No.: 10/209,873

(22) Filed: Aug. 2, 2002

(65) Prior Publication Data

US 2003/0155805 A1 Aug. 21, 2003

(30) Foreign Application Priority Data

Feb. 18, 2002 (JP) ....................................... 2002-039903

(51) Int. Cl.[7] .............................................. B60B 21/02
(52) U.S. Cl. .............................. 301/95.107; 301/95.108
(58) Field of Search ........................ 301/95.101, 95.105, 301/95.107, 95.108, 95, 96, 97, 98; 29/894.35, 894.353, 894.354

(56) References Cited

U.S. PATENT DOCUMENTS

| 1,912,594 A | * | 6/1933 | Suazedde |
| 2,057,565 A | * | 10/1936 | Eksergian |
| 2,200,361 A | * | 5/1940 | Hunt |
| 3,784,260 A | * | 1/1974 | Araya |

FOREIGN PATENT DOCUMENTS

| DE | 625055 | * | 9/1933 | ................. 301/97 |
| FR | 419679 | * | 1/1911 | ................. 301/97 |
| FR | 802125 | * | 8/1936 | ................. 301/97 |
| FR | 49486 | * | 5/1939 | ................. 301/97 |

* cited by examiner

Primary Examiner—Russell D. Stormer
(74) Attorney, Agent, or Firm—Armstrong, Kratz, Quintos, Hanson & Brooks, LLP

(57) ABSTRACT

It is an object of the present invention to provide a wheel rim equipped with rim flanges that show no deformation or damage even though a reduction in weight is achieved. The wheel is equipped with rim flanges 3 consisting of a double structure in which the end portions across the rim part 2 of width of the rim are folded back to the inside and caused to contact the non-folded portions 3B in a state in which there is no gap. The abovementioned folded portions 3A and non-folded portions 3B have respective thicknesses that are greater than the thickness D1 of the rim part, and curved parts 3C that are smoothly continuous with the surfaces of the non-folded portions 3B are provided on the free end portions of the folded portions 3A.

1 Claim, 6 Drawing Sheets

(a)

(b)

(c)

(d)

WHEEL RIM AND WHEEL RIM MANUFACTURING METHOD

TECHNICAL FIELD

The present invention relates to a wheel rim in which both ends of an annular rim part (with respect to the direction of width of the rim) are equipped with rim flanges, and a manufacturing method which is used to manufacture this wheel rim.

BACKGROUND ART

For example, cast one-piece wheels which are manufactured by causing a molten metal to flow into a mold are available as wheels; however, two-piece wheels (assembled from two parts, i.e., an annular rim part and a disk part) and three-piece wheels (assembled from three parts, i.e., an annular outer rim part, an annular inner rim part and a disk part) which make it possible to enhance the fashion characteristics of the area around the disk surface, and which are advantageous in terms of productivity, have attracted attention in recent years.

Furthermore, in regard to the abovementioned wheels, the following two types of wheels have been proposed in order to make the rim part thinner for the purpose of reducing the weight of the wheel, and also in order to increase the rigidity so that there is no damage such as cracking or the like or deformation of the rim flanges disposed on both ends of the rim part, in which there is a maximum concentration of stress from the tires during operation of the vehicle.

First, the first wheel is a wheel equipped with rim flanges in which both end portions of the rim part are folded double and press-bonded as indicated in Japanese Patent Application Laid-Open No. 2001-259769.

Furthermore, the second wheel is a wheel in which both ends of the rim part are bent and molded to the inside (which is the tire attachment side), and the insides of the bent and molded portions are lined with a wire ring, as indicated in Japanese Utility Model Application Laid-Open No. 62-165102.

Furthermore, the rigidity might conceivably be increased by making the thickness of the rim flanges thicker than the thickness of the rim part by casting or the like; in such a case, however, there are disadvantages in terms of cost. Accordingly, the rigidity of the rim flanges is increased by folding or pressing plate materials of the same thickness.

In the case of the first wheel mentioned above, both end portions of the rim are merely folded double and press-bonded; accordingly, it cannot be guaranteed that the thickness of the rim flanges is twice the thickness of the rim part, and there is a danger of damage such as cracking or deformation of the rim flanges. Furthermore, if a gap is generated between the contact surfaces of the folded portions and non-folded portions in the abovementioned folded and press-bonded state, there is a danger of a drop in strength due to cracking or the like in these portions. Accordingly, it is necessary to press-bond the end portions on the folded side of the rim part to the end portions on the non-folded side by means of a large force; as a result, the end portions of the rim part are crushed in some areas, so that the thickness of the rim flanges is actually less than twice the thickness of the rim part, as was described above, thus making it impossible to eliminate the abovementioned problem. In this case, increasing the thickness of the plate material that forms the rim part might be conceivable. In such a case, however, the overall weight of the wheel is increased; accordingly, such an approach is difficult in practical terms, and there is room for improvement.

Furthermore, in the case of the second wheel, not only are wire rings that constitute separately formed extra parts required, but the bothersome work of attaching these wire rings during the molding of the wheel is necessary. Moreover, because of this lining with wire rings, gaps are generated between the bend molded parts that are molded by bending and the non-bent parts; as a result, although the strength is increased in the areas where the wire rings are located, there is an extreme drop in strength in the areas that lack these wire rings.

DISCLOSURE OF THE INVENTION

With the foregoing in view, it is an object of the present invention to provide a wheel rim which is equipped with rim flanges that show no deformation or damage, even though the weight of the wheel rim is reduced.

In order to achieve the abovementioned object, the present invention constructs a wheel rim which is equipped with a rim flange consisting of a double structure in which at least the outer-side end portion of the opposite ends across the rim part is folded back toward the inside which is the tire attachment side, and caused to contact the non-folded portion of the rim part without any gap, and wherein said folded portion and said non-folded portion respectively have thicknesses that are greater than the thickness of said rim part, and a curved part which is smoothly continuous with the surface of said non-folded portion is provided on the free end portion of said folded portion.

Accordingly, since the rim flange is formed with a double structure consisting of a folded portion and a non-folded portion, and since the respective thicknesses of the folded portion and the non-folded portion are thicker than the thickness of the rim part, the thickness of the rim flange is a thickness that is more than twice the thickness of the rim part, so that an increase in strength compared to conventional wheels can be realized. Furthermore, since the folded portion and the non-folded portion are caused to contact each other in a state in which there is no gap, the desired strength can be obtained in all portions of the rim flange. Moreover, since the outer side end portion is folded to the inside, which is the tire attachment side, the folded free end portion is hidden by the tire, and is therefore not exposed in a position that can be seen from the outside. Accordingly, there is no loss of the design characteristics of the wheel. Furthermore, the free end portion of the folded portion has a curved part that is smoothly continuous with the surface of the non-folded portion; accordingly, even in cases where the free end portion of the folded portion has a corner part that protrudes with respect to the non-folded portion, damage to the tire caused by the contact of this corner part with the tire, and the deposition of foreign matter such as mud, dirt or the like on this corner part, can be securely avoided.

In the present invention, the rim flange of the wheel is formed by curling means for curling at least the outer side end portion of the opposite ends across the, rim toward the inside which is the tire attachment side in a curvilinear manner; and by roll-forming means for forming the free end portion of said folded portion so that this free end portion is smoothly continuous with the surface of said non-folded portion, while simultaneously producing a double structure in which the curled portion that has been curled by said curling means is folded back and laid on the non-curled portion without any gap by pressing same against the non-curled portion, and for performing finish forming so that the thickness of said folded portion that is folded back and the thickness of the non-folded portion that is caused to contact said folded portion in a state in which there is no gap therebetween are specified thicknesses that are greater than the thickness of said rim part.

Since the rim flange is formed with a double structure using curling means and roll-forming means as described above, the rim flange can be molded so that this rim flange has a specified thickness that is more than twice the thickness of the rim part, so that an increase in strength compared to conventional wheels can be reliably accomplished. Furthermore, since the outer side end portion is folded to the inside (which is the tire attachment side) in the same manner as in the first invention, the folded free end portion is hidden by the tire, and is therefore not exposed in a position that can be seen from the outside. Accordingly, there is no loss of the design characteristics of the wheel. Furthermore, the free end portion of the folded portion has a curved part that is smoothly continuous with the surface of the non-folded portion; accordingly, even in cases where the free end portion of the folded portion has a corner part that protrudes with respect to the non-folded portion, damage to the tire caused by the contact of this corner part with the tire, and the deposition of foreign matter such as mud, dirt or the like on this corner part, can be securely avoided.

The above-mentioned curling means are means for curling the outer side end portion so that, when the outer side end portion is curled to the inside, the resulting thickness is greater than said specified thickness, and the above-mentioned d roll-forming means are means which press the free end side of said curled portion against said non-curled portion so that the free end portion of said folded portion is smoothly continuous with the surface of said non-folded portion, while at the same time perform finish forming of said folded portion and non-folded portion into a specified shape so that the thickness of said folded portion and the thickness of the non-folded portion that is caused to contact said folded portion in a state in which there is no gap therebetween are specified thicknesses that are greater than the thickness of said rim part.

When the outer side end portion is curled to the inside by the curling means, the curled part is deformed toward the compression side, so that the thickness is increased by an amount corresponding to this compression. Utilizing this, it is possible to perform curling so that the resulting thickness is greater than the abovementioned specified thickness by a desired amount. Furthermore, it is possible to mold the curled portion that is reached the abovementioned specified thickness to a further specified thickness using the roll-forming means, and to perform finish forming into a specified shape by pressing the free end portion of the curled portion so that this free end portion is smoothly continuous with the surface of the non-folded portion.

BEST MODE FOR CARRYING OUT THE INVENTION

Figure 1:
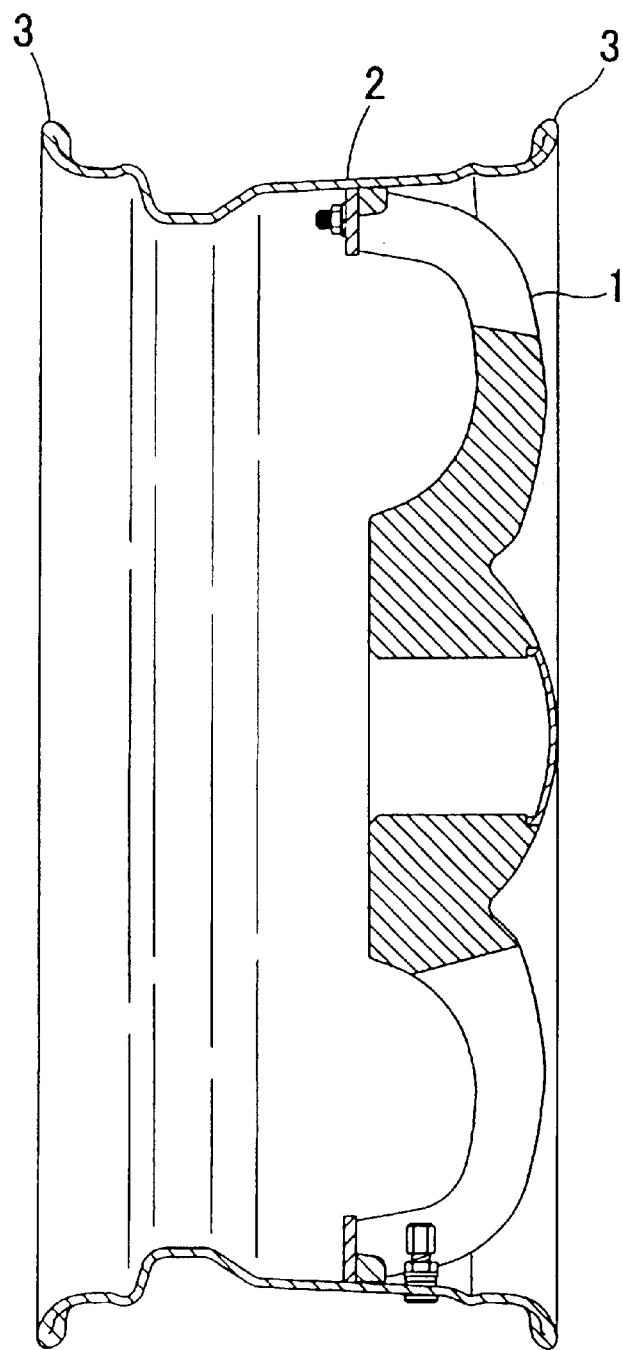
FIG. 1 is a partially cut-away side view of a two-piece wheel.

FIG. 1 shows a vehicle (automobile) wheel (also called a two-piece wheel) which comprises two members, i.e., a metal disk member 1, and an annular wheel rim which is formed by pressing or the like from a single metal plate material that has a uniform thickness at all points. The abovementioned wheel rim has an annular shape, and consists of a tubular rim part 2, and rim flanges 3, 3 which are formed by a double structure formed in an upright attitude on both ends of the rim part 2 (with respect to the direction of width of the rim) in a direction that is perpendicular to the surface of the rim part 2 that carries the tire (not shown in the figures). Any desired metal materials may be used as the metal materials of the respective members constituting the abovementioned wheel, as long as these metal materials have abundant ductility. However, it is desirable to use aluminum alloys, magnesium alloys or the like in order to improve the operating performance of the vehicle.

Figure 2:
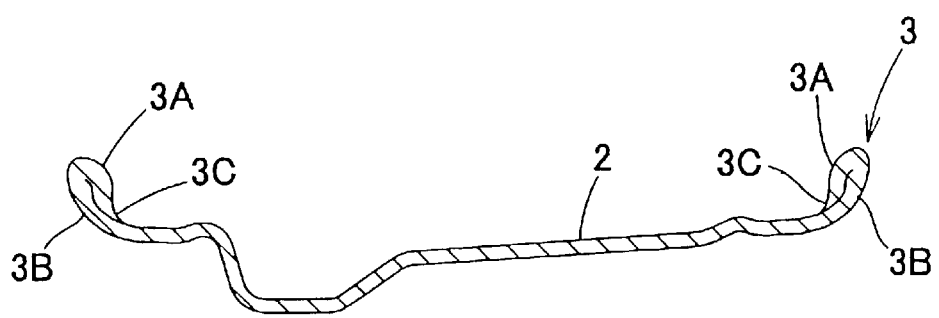
FIG. 2 is a longitudinal-sectional side view of the wheel rim.
Figure 3:
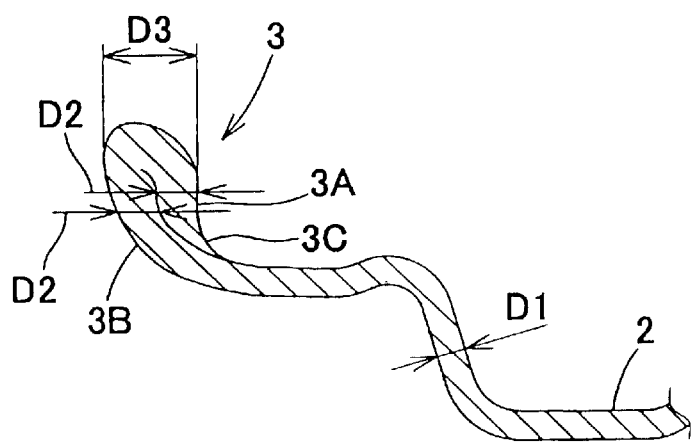
FIG. 3 is a longitudinal sectional view which shows one of the rim flanges of the wheel rim.
Figure 4:
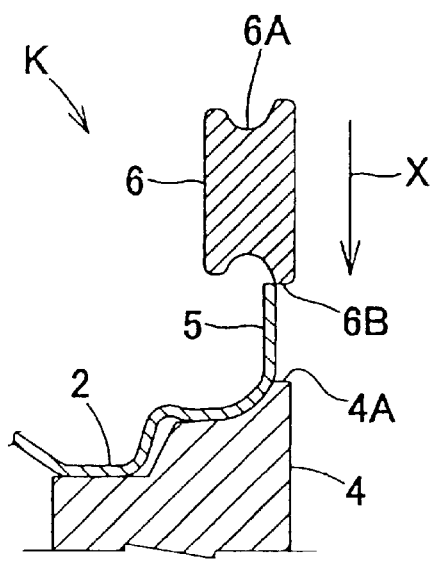
FIG. 4 shows sectional views of essential parts illustrating the procedure whereby the end portion of the rim part is curled by the curling means, with FIG. 4(a) showing the instant at which the rotating bending roller contacts the end portion of the rim part, FIGS. 4(b) and 4(c) showing how the end portion of the rim part is gradually curled, and FIG. 4(d) showing the state in which the curling of the end portion of the rim part is completed.
Figure 4:
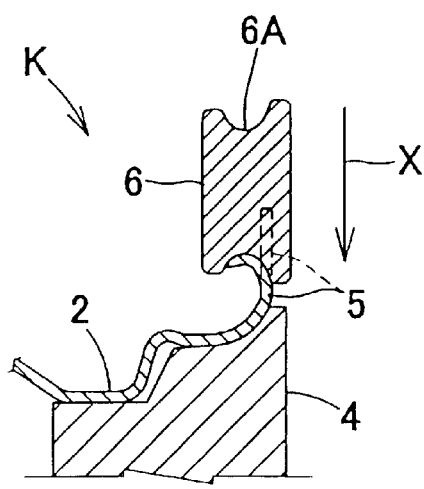
Figure 4:
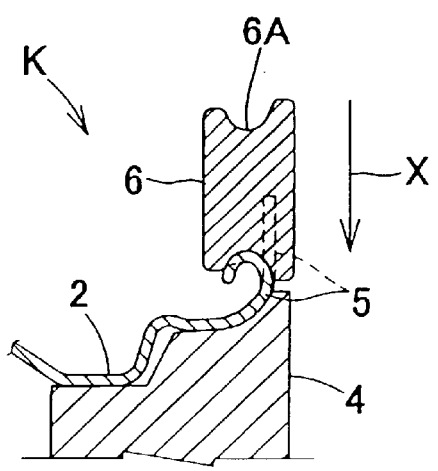
Figure 4:
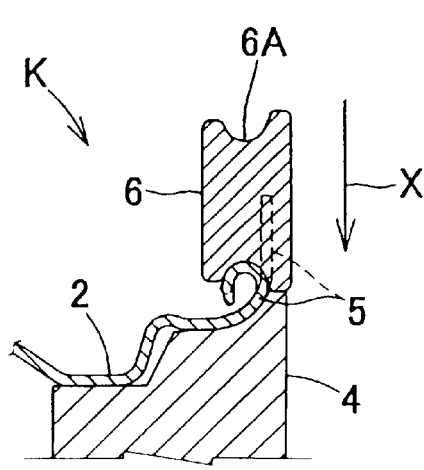

To describe the abovementioned rim flanges 3 in detail, as shown in FIGS. 2 and 3, both ends of the rim part 2 (with respect to the direction of width of the rim) are folded to the inside (which is the tire attachment side), and are caused to contact the non-folded portions in a state in which there is no gap (i.e., in a pressed state), so that rim flanges 3, 3 consisting of a double structure are formed. The abovementioned folded portions 3A and non-folded portions 3B respectively have a thickness D2 that is greater than the thickness D1 of the abovementioned rim part 2, and curved parts 3C that are smoothly continuous with the surfaces of the abovementioned non-folded portions 3B are disposed on the free end portions of the abovementioned folded portions 3A.

For example, in a case where the thickness D1 of the abovementioned rim part 2 is set at 5 mm, the respective thicknesses D2 of the abovementioned folded portion 3A and non-folded portion 3B are set at approximately 7 mm (approximately 1.4 times D1), so that the overall thickness D3 of the rim flanges 3 is 14 mm (approximately 2.8 times D1). In this way, the strength of the rim flanges 3 can be greatly increased; however, values other than these numerical values may also be used. Here, the respective thicknesses D2 of the folded portion 3A and non-folded portion 3B are the same value; however, since these portions are integrated in a state in which there are no gaps, these thicknesses may also be set at different values.

Figure 5:
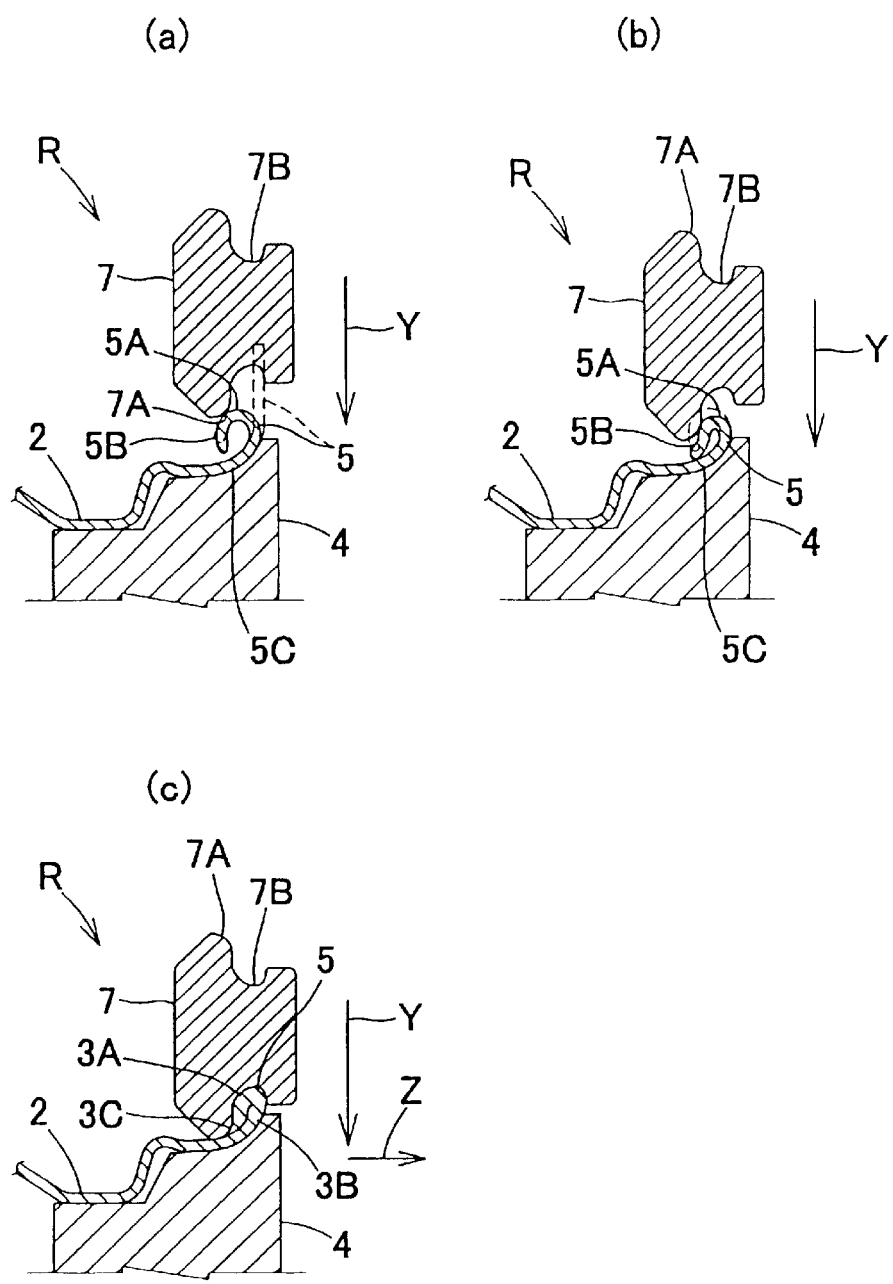
FIG. 5 shows sectional views of essential parts illustrating the procedure whereby the end portion of the rim part that has been curled is subjected to finish forming into a desired shape by the roll-forming means, with FIG. 5(a) showing a state in which the curled portion is pressed, FIG. 5(b) showing a state in which the curled portion is indented, and FIG. 5(c) showing a state in which the end portion of the rim part has been molded into the final shape.

Next, to describe the method used to form the abovementioned rim flanges 3, the rim flanges 3 of the wheel are formed using curling means K (see FIGS. 4(a) through 4(d))

that curl both end portions of the rim part 2 (with respect to the direction of width of the rim) toward the inside (which is the tire attachment side) in a curvilinear manner, and roll-forming means R (see FIGS. 5(a) through 5(c)) that form double structure parts which are folded back without any gap by pressing the curled portions that are curled by the abovementioned curling means against the non-curled portions, and at the same time mold the free end portions of the abovementioned folded portions 3A so that these free end portions are smoothly continuous with the surfaces of the abovementioned non-folded portions 3B as shown in FIG. 3, and that perform finish forming so that the thickness D2 of the abovementioned folded portions 3A that are folded back and the thickness D2 of the non-folded portions 3B that are caused to contact the abovementioned folded portions 3A in a state in which there is no gap are specified thicknesses that are greater than the thickness D1 of the abovementioned rim part 2.

As is shown in FIGS. 4(a) through 4(d), the abovementioned curling means consist of a rotating jig 4 which is used to rotate the rim part 2 formed by forming a single metal plate material into a specified shape, and rotating bending rollers 6 in which circular-arc-form recessed parts 6A are formed that are used to perform curling by a process in which longitudinal parts 5 that are formed on both ends (only one end is shown in the figures) of the rim part 2 fastened to the abovementioned rotating jig 4 so that these longitudinal parts 5 run in a direction perpendicular the surface of the rim part (i.e., perpendicular to the direction of width of the rim) are pressed from the abovementioned perpendicular direction (i.e., the direction indicated by the arrow X). When the longitudinal parts 5 are curled to the inside, the resulting thickness of these parts is greater than the abovementioned specified thickness D2. In the figures, only one of the abovementioned rotating bending rollers 6 is shown; however, it is desirable to dispose a plurality of these rollers in the circumferential direction, so that smooth curling can be achieved by pressing the abovementioned longitudinal parts 5 in a plurality of places. Furthermore, the abovementioned rotating bending rollers 6 are constructed from following rollers that can receive the rotational force of the longitudinal parts 5 and rotate smoothly as a unit at the point in time at which these rollers contact the rotating longitudinal parts 5. Alternatively, curling can also be performed using means other than the abovementioned rotating bending rollers 6.

Accordingly, since the longitudinal parts 5 are moved (pressed) in a state in which the rotating bending rollers 6 are caused to contact the longitudinal parts 5 (which have been placed in a rotating state by the rotating jig 4), the longitudinal parts 5 can be gradually curled (bend) along the recessed parts 6A of the rotating bending rollers 6 as shown in FIGS. 4(a) through 4(c). Then, as is shown in FIG. 4(d), the abovementioned curling treatment is completed as a result of the outer circumferential end surfaces 6B of the abovementioned rotating bending rollers 6 contacting the outer circumferential end surface 4A of the abovementioned rotating jig 4.

As is shown in FIGS. 5(a) through 5(c), the abovementioned roll-forming means R are constructed from the abovementioned rotating jig 4 and finishing rotating press-bonding rollers 7, each of which has a projecting part 7A with a circular-arc-form curved surface that is used to press the free end portion (tip end portion) 5B of the corresponding curled portion 5 (excluding the bent portion 5A) from a location on the side of the bent portion 5A so that the free end portion of the abovementioned folded portion 3A is molded in such a manner that this free end portion is smoothly continuous with the surface of the abovementioned non-folded portion 3B, and a recessed part 7B with a circular-arc-form curved surface that is used to mold the folded portion 3A and non-folded portion 3B into desired shapes so that the thickness of the abovementioned folded portion 3A and the thickness of the abovementioned non-folded portion 3B are both a specified thickness D2 that is greater than the thickness D1 of the abovementioned rim part 2. Only one of the abovementioned finishing rotating press-bonding rollers 7 is shown in the figures; however, it is desirable to dispose a plurality of these rollers in the circumferential direction, so that smooth finish forming can be achieved by pressing the abovementioned curled longitudinal parts 5 in a plurality of places. Alternatively, finish forming can also be performed using means other than the abovementioned finishing rotating press-bonding rollers 7.

Accordingly, since the finishing rotating press-bonding rollers 7 are moved in the direction indicated by the arrow Y in the figures with respect to the curled portions 5 as shown in FIG. 5(a), the free end portions 5B of the curled portions 5 can be pressed by the projecting parts 7A from locations on the side of the folded portions 5A, so that, as shown in FIG. 5(b), the free end portions 5B are caused to contact the non-curled portions 5C while being deformed in the opposite direction from the curling direction, thus gradually reducing the spaces that are formed on the insides of the curled portions 5; at the same time, as is shown in FIG. 5(c), the free end portions 5B are pressed (crushed by pressing) so that curved parts 3C that are smoothly continuous with the surfaces of the non-curled portions 5 are formed, and rim flanges 3 with the shape shown in FIG. 3 can be obtained by moving the finishing rotating press-bonding rollers 7 in the direction indicated by the arrow Z which is oriented outward in a direction perpendicular to the abovementioned arrow Y.

Figure 6:
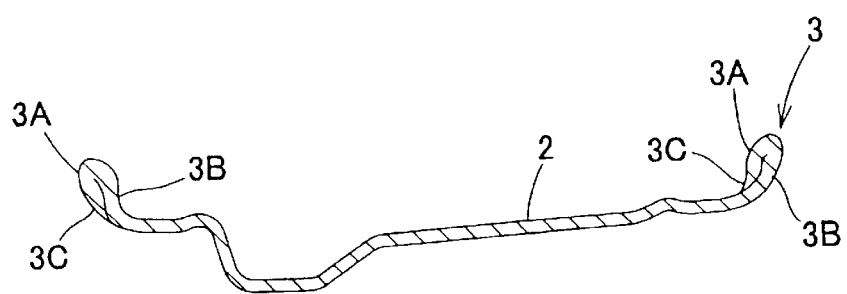
FIG. 6 is a longitudinal-sectional side view of a wheel rim with a different shape.

In FIGS. 1 through 5, a case was illustrated in which both ends of the rim part 2 (with respect to the direction of width of the rim) were folded to the inside (which is the tire attachment side). However, as is shown in FIG. 6, it would also be possible to fold the outer end portion (of the two ends of the abovementioned rim part 2 with respect to the direction of width of the rim) to the inside (which is the tire attachment side), so that the folded free end portion is hidden by the tire and is thus invisible from the outside, and to fold the inner end portion (in which the abovementioned free end portion cannot be seen from the outside) to the outside, which is the opposite side form the tire attachment side.

Figure 7:
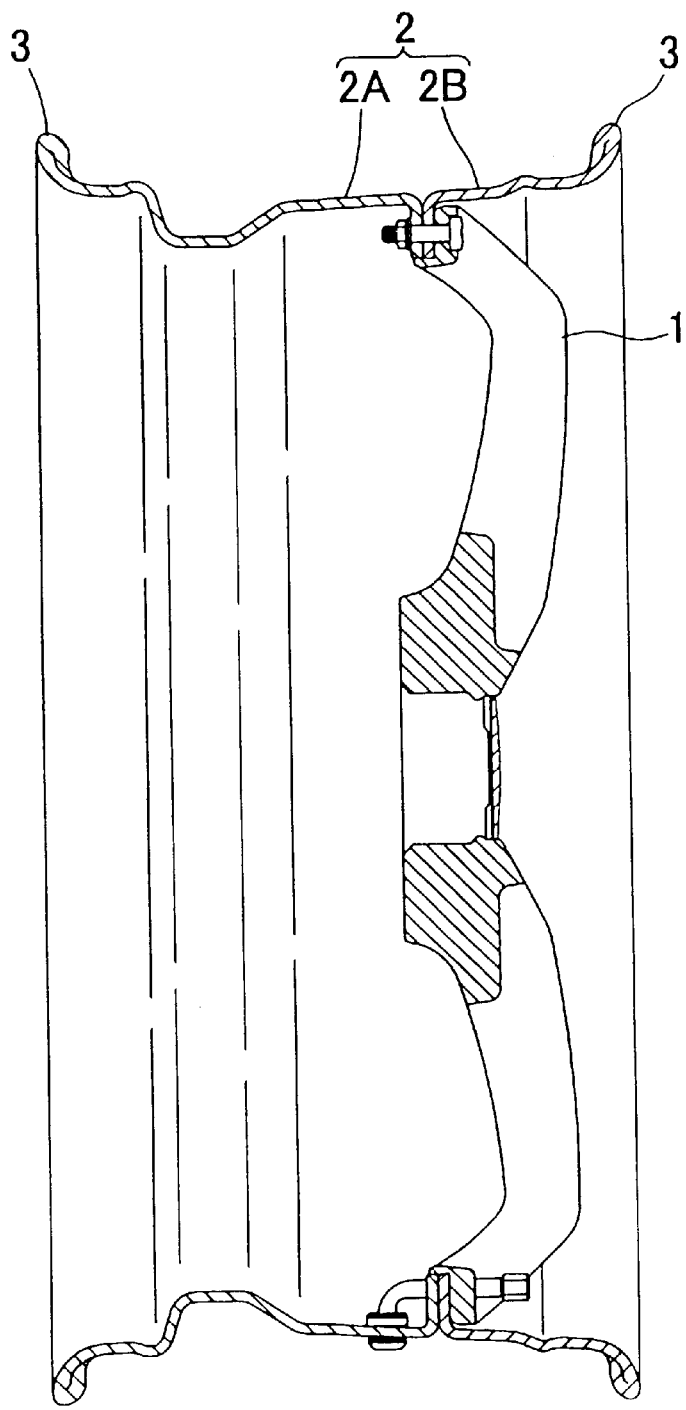
FIG. 7 is a partially cut-away side view of a three-piece wheel.

The wheel shown in FIG. 1 is a two-piece wheel constructed from two members; however, this wheel may also be constructed from a three-piece wheel in which the abovementioned rim part 2 is constructed from two split rims 2A and 2B that are split into an inner side and outer side, as shown in FIG. 7.

In the first or second invention, the rim flanges are formed with a double structure consisting of folded portions and non-folded portions, and the respective thicknesses of the folded portions and non-folded portions are greater than the thickness of the rim part. Accordingly, the rim part can be made thinner and lighter as in conventional wheels, and at the same time, the thickness of the rim flanges can be set at a thickness that is more than twice the thickness of the rim part, without using casting or the like. Accordingly, a wheel rim can be provided which is advantageous in terms of cost, and which makes it possible to realize an increase in strength compared to conventional wheels, so that there is no deformation or damage.

Furthermore, since the abovementioned folded portions and non-folded portions are caused to contact each other in a state in which there is no gap, the desired strength can be obtained in all parts of the rim flanges, so that the reliability of the wheel can be increased.

Furthermore, since the outer side end portion is folded to the inside, which is the tire attachment side, the folded free end portion is hidden by the tire, and is therefore not exposed in a position that can be seen from the outside. Accordingly, a wheel which has commercial product power (sales promotion power) can be obtained without any loss of the design characteristics of the wheel.

Furthermore, curved parts that are smoothly continuous with the surfaces of the non-folded portions are disposed on the free end portions of the folded portions; accordingly, in cases where the free end portions of the folded portions have corner parts that protrude with respect to the non-folded portions, damage to the tire caused by the contact of these corner parts with the tire, and the deposition of foreign matter such as mud, dirt or the like on these corner parts, can be securely avoided, so that a wheel with even higher reliability can be obtained.

In the third invention, the thickness of the curled portions can be increased to a specified thickness merely by performing curling. Accordingly, there is no need for special working, so that there is no increase in cost in terms of expenditures on equipment or the like. Furthermore, by molding the curled portions that have reached the abovementioned specified thickness to a further specified thickness using the roll-forming means, and subjecting the free end portions of the curled portions to finish forming into a specified shape by pressing these free end portions so that these portions are smoothly continuous with the surfaces of the non-folded portions, it is possible to manufacture wheels that always have the same shape and the same strength, so that a highly reliable manufacturing method that shows little variation in the resulting products can be obtained.

What is claimed is:

1. A wheel rim which is equipped with a rim flange consisting of a double structure in which at least the outer-side end portion of the opposite ends across the rim part is folded back toward a tire attachment side, and caused to contact the non-folded portion of the rim part without any gap, and wherein said folded portion, having a free end portion, and said non-folded portion respectively have thicknesses that are greater than the thickness of said rim part, and a curved part which is smoothly continuous with the surface of said non-folded portion is provided on the free end portion of said folded portion.

* * * * *